United States Patent
Honma et al.

[11] Patent Number: 5,905,612
[45] Date of Patent: May 18, 1999

[54] MAGNETIC HEAD AND PRODUCING METHOD OF THE SAME

[75] Inventors: Yoshiyasu Honma, Katano; Ken Masaki, Hirakata; Ken Takahashi, Osaka, all of Japan

[73] Assignee: Matsushita Electric Industrial Co. Ltd., Osaka, Japan

[21] Appl. No.: 08/895,205

[22] Filed: Jul. 16, 1997

Related U.S. Application Data

[63] Continuation of application No. 08/635,790, Apr. 22, 1996, abandoned, which is a continuation of application No. 08/313,594, Sep. 29, 1994, abandoned.

[30] Foreign Application Priority Data

| Oct. 4, 1993 | [JP] | Japan | 5-247901 |
| Dec. 8, 1993 | [JP] | Japan | 5-307845 |
| Sep. 29, 1994 | [JP] | Japan | 6-235705 |

[51] Int. Cl.$^6$ .............................. G11B 5/23; G11B 5/127
[52] U.S. Cl. ........................................ 360/119; 360/126
[58] Field of Search ........................ 360/119, 120, 360/122, 125, 126, 127

[56] References Cited

U.S. PATENT DOCUMENTS

| 3,668,775 | 6/1972 | Morita et al. | 29/603 |
| 4,110,902 | 9/1978 | Tamura et al. | 29/603 |
| 4,425,701 | 1/1984 | Takahashi et al. | 360/121 X |
| 5,099,376 | 3/1992 | Ino et al. | 360/120 |
| 5,170,301 | 12/1992 | Muraoka et al. | 360/120 |
| 5,208,965 | 5/1993 | Ozeki et al. | 29/603 |
| 5,210,668 | 5/1993 | Sillen et al. | 360/120 |

FOREIGN PATENT DOCUMENTS

| 361809 | 4/1990 | European Pat. Off. . |
| 414969A1 | 3/1991 | European Pat. Off. . |
| 59-223924 | 12/1984 | Japan . |
| 61-123007 | 6/1986 | Japan . |
| 61-260408 | 11/1986 | Japan . |
| 63-70912 | 3/1988 | Japan . |
| 1-276412 | 11/1989 | Japan . |
| 2-276009 | 11/1990 | Japan . |
| 4-305805 | 10/1992 | Japan . |
| 4-353607 | 12/1992 | Japan . |
| 5-143919 | 6/1993 | Japan . |
| 6-150243 | 5/1994 | Japan . |
| 6-208705 | 7/1994 | Japan . |
| 6-295412 | 10/1994 | Japan . |

OTHER PUBLICATIONS

Abstract for 58097124 dated Jun. 9, 1983.

*Primary Examiner*—William J. Klimowicz
*Attorney, Agent, or Firm*—Smith, Gambrell & Russell, Beveridge, DeGrandi, Weilacher & Young Intellectual Property Group

[57] ABSTRACT

A magnetic head can be made by a first step of butting projection end faces of a pair of magnetic cores, each of which is previously machined into a convex shape, through a magnetic gap member; a second step of forming notches which reach a winding groove, at the butted projection end faces of the magnetic cores by an electric discharge machining process, thereby regulating a track width; and a third step of filling, under heat treatment, glass into grooves at two sides of the pair of convex magnetic cores and the notches. When the magnetic head is used, a magnetic recording/reproduction apparatus which is suitable for high density recording such as a digital VTR is provided.

18 Claims, 11 Drawing Sheets

MAGNETIC HEAD AND PRODUCING METHOD OF THE SAME

This application is a continuation, of application Ser. No. 08/635,790, filed Apr. 22, 1996, now abandoned, which was a continuation of application Ser. No. 08/313,594, filed Sep. 29, 1994 (abandoned), which applications are entirely incorporated herein by reference.

BACKGROUND OF THE INVENTION

1. Field of the Invention

The invention relates to a magnetic head which performs recording or reproduction on a magnetic recording medium, and particularly to a narrow-track magnetic head for high density recording which is useful in a digital VTR or the like, a method of producing the same, and a magnetic recording/reproduction apparatus.

2. Description of the Prior Art

In a system such as a digital VTR wherein a large amount of signals are recorded and reproduced, it is essential to employ high density magnetic recording/reproduction techniques such as the narrow-track technique and the short-wavelength technique.

Generally, it is known that high density magnetic recording/reproduction can be attained when the coercive force of a magnetic medium is increased and the saturation magnetic flux density (hereinafter, referred to as "Bs") of a magnetic head is increased. A ferrite material which has mainly been used in the prior art as a magnetic head material has Bs of about 0.5 T. When a ferrite magnetic head is used for a metal tape having a coercive force as high as 80 kA/m or more, therefore, there occurs magnetic saturation so that recording cannot be conducted satisfactorily. To comply with this, research efforts have vigorously been conducted on magnetic heads using a material which has a Bs larger than ferrite, such as a Sendust alloy material (Bs: about 1.0 T), a Co amorphous film (Bs: about 0.8 to 1.1 T), or a novel material such as a Co superstructure nitriding alloy film having a Bs of 1.3 T or more, an Fe superstructure nitride film, or an Fe nitride film, particularly on a composite magnetic head or so-called MIG head in which the main core is made of ferrite and a magnetic thin film is disposed at least in the vicinity of the front gap.

FIG. 10 shows the configuration of a MIG head. A pair of convex magnetic cores 2 and 3 which are opposed to each other through a magnetic gap 1 respectively comprise convex core bodies 4 and 5 made of ferrite, and high saturation magnetic flux density films 6 and 7 which cover the respective projection end faces of the core bodies and both the side faces elongating therefrom. The two magnetic cores 2 and 3 are coupled to each other by a pair of glass blocks 8 and 9 which are disposed at their both sides. The reference numeral 10 designates a winding hole through which coils can pass.

In such a magnetic head, as shown in FIG. 11 in detail, track dis-adjustments $d_1$, and $d_2$ are easily produced by production errors due to machining accuracy of track grooves 4a and 5a of the pair of core bodies 4 and 5, and butting accuracy of the core bodies 4 and 5. Moreover, the presence of rounds 2a, 2b, 3a and 3b of edge portions of the magnetic films 6 and 7 further impairs the track width accuracy.

In high density recording, these divergences and rounds of the edges tend to cause impairment.

As partly disclosed by U.S. Pat. No. 4,110,902, a method of regulating the track width by using a wire on a sliding face may be employed. In the method, however, the whole of the sliding face is machined so as to have a fixed track width, and the running of a magnetic medium causes a problem of abrasion resistance. Furthermore, magnetic properties are greatly impaired. According to the invention, a machining process is conducted only on the vicinity of a gap, and therefore the problem of abrasion resistance and the impairment of magnetic properties do not occur.

U.S. Pat. No. 3,668,775 discloses a configuration in which the whole of a core constitutes the track width. Also in this configuration, magnetic properties are greatly impaired. Moreover, the chip has a reduced strength.

U.S. Pat. No. 5,208,965 discloses a method in which a track width is regulated by track width regulation grooves. In the disclosed method, cores are separately machined, and then butted to be joined to each other, thereby producing butting errors. Therefore, the method cannot be employed in a production of a narrow-track width head.

Recently, the track width and its accuracy are requested to be 10 $\mu$m or less and ±0.5 $\mu$m, respectively. As described above, however, it is substantially impossible according to the prior art to produce a magnetic head which fulfills the requirements while preventing the magnetic properties from being impaired.

SUMMARY OF THE INVENTION

It is an object of the invention to provide a narrow-track magnetic head for high density recording and of high performance.

It is another object of the invention to provide a method of producing a narrow-track magnetic head at an improved yield and a lower cost.

It is a further object of the invention to provide a magnetic recording/reproduction apparatus which is suitable for a narrow track pitch.

In order to attain the objects, the magnetic head of the invention comprises:

a pair of magnetic cores each of which is previously machined into a convex shape and which are opposed to each other so that projection end faces are opposed to each other through a magnetic gap member;

a pair of glass blocks which are disposed at their both sides to couple the magnetic cores to each other; and notches which extend over the magnetic cores on a magnetic tape sliding face constituted by the magnetic cores, the notches being formed to be separated from the convex machined portions which regulate a track width, the notches being respectively located at both longitudinal ends of the magnetic gap as seen from the magnetic tape sliding face, and reaching a winding groove while maintaining the track width attained at the magnetic tape sliding face.

According to this configuration, a magnetic head which is suitable for a narrow track used in high density recording and free from a track divergence can be obtained at an improved yield and a lower cost. Since the track width is constant over a range from the face to the winding groove, furthermore, the track width does not vary even when the magnetic head is abraded, so that a head of high reliability is supplied.

When the head is used, it is possible to provide a magnetic recording/reproduction apparatus which is suitable for a digital VTR.

DESCRIPTION OF THE PREFERRED EMBODIMENTS

Hereinafter, embodiments of the invention will be described with reference to the drawings.

Figure 1:
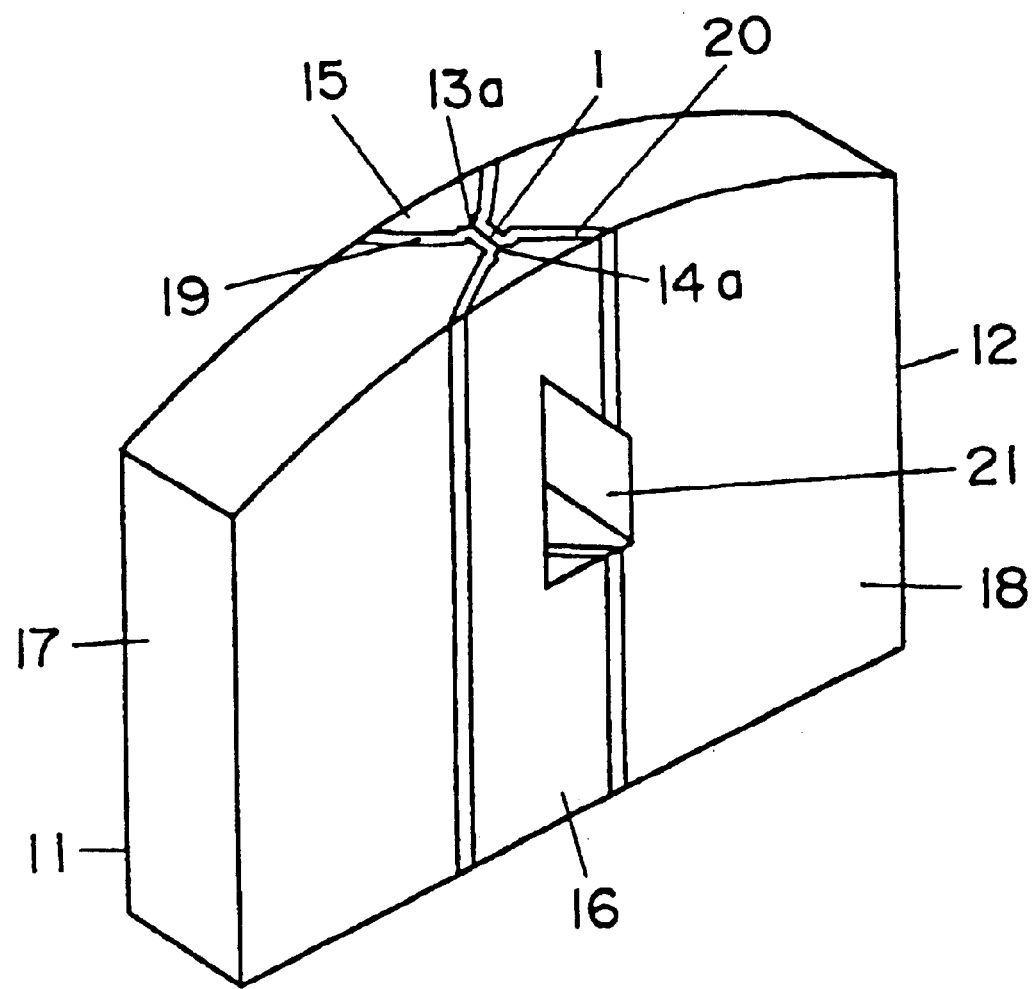
FIG. 1 is a perspective view of a magnetic head chip of an embodiment of the invention.
Figure 2:
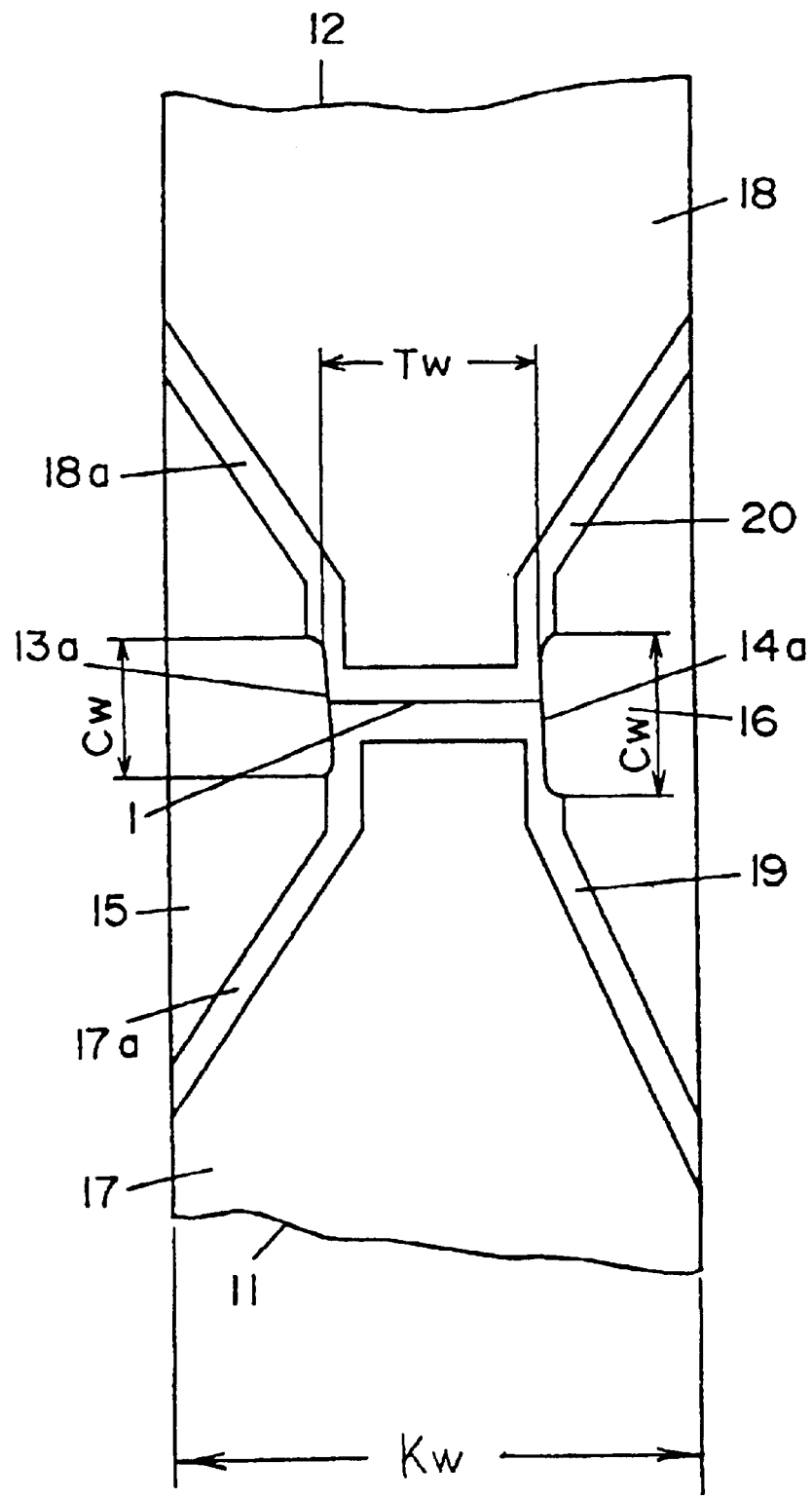
FIG. 2 is a plan view of a part of the magnetic head chip of the embodiment of the invention.
Figure 10:
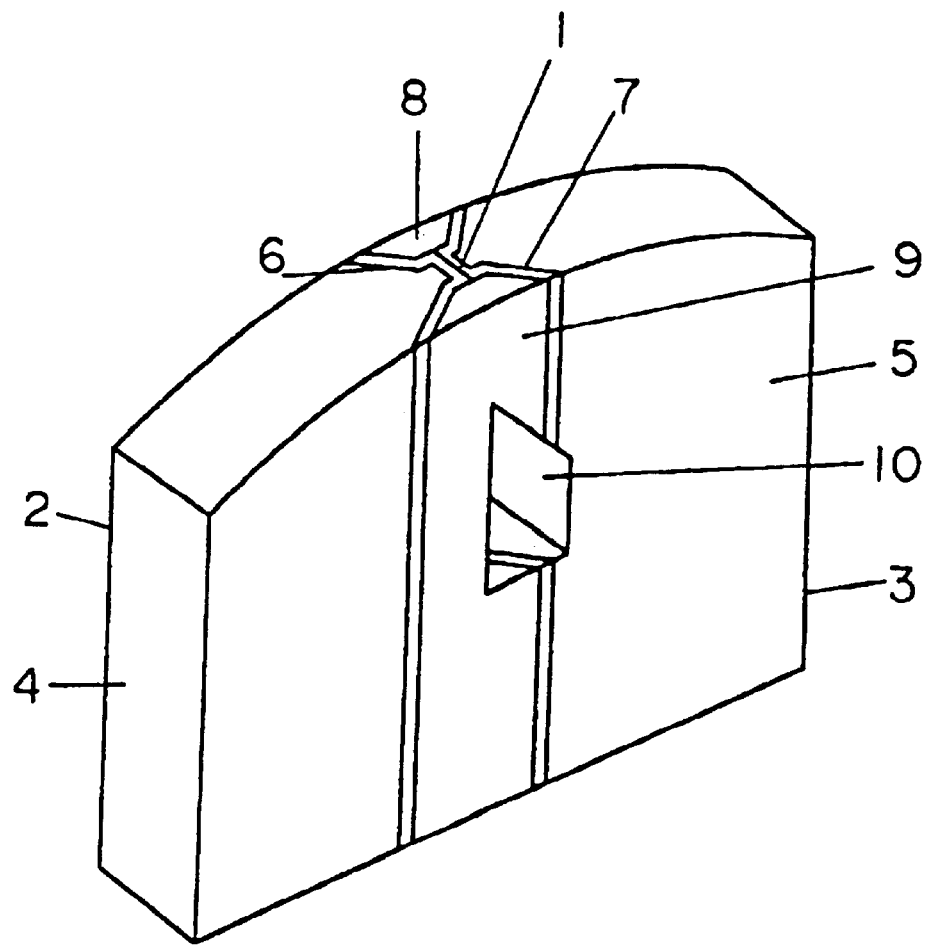
FIG. 10 is a perspective view of a prior art magnetic head chip.
Figure 11:
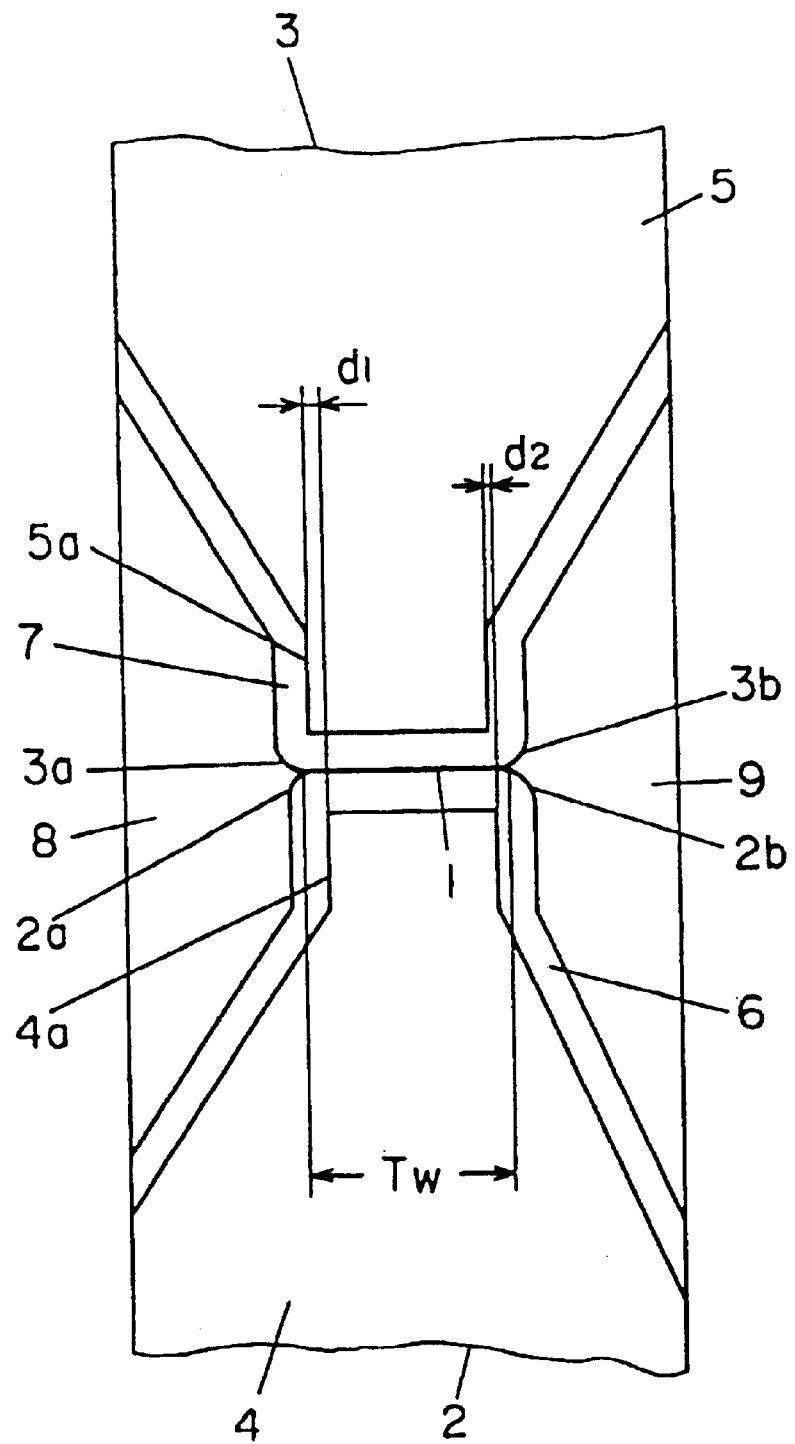
FIG. 11 is a plan view of a part of the prior art magnetic head chip.

A magnetic head shown in FIGS. 1 and 2 is fundamentally different from the prior art magnetic head shown in FIGS. 10 and 12 in that a pair of convex magnetic cores 11 and 12 have notches 13a and 14a which dig into side faces of magnetic films 19 and 20 in the range from the magnetic tape sliding face of the cores to a winding window 21 and are cut to an equal size in a direction perpendicular to the track width direction, and that the track width TW is regulated by the notches 13a and 14a.

In the magnetic head, the pair of convex magnetic cores 11 and 12 which are opposed to each other through a magnetic gap 1 are bonded to each other by glass blocks 15 and 16.

The convex magnetic cores 11 and 12 are mainly made of ferrite, and have the magnetic films 19 and 20 and the convex core bodies 17,18. The magnetic films 19,20 have a high saturation magnetic flux density and cover the respective projection end faces of the convex core bodies 17 and 18 and both the side faces elongating therefrom. The side faces of the magnetic films 19 and 20 are cut to an equal size in the track width direction by the notches 13a and 14a. The notches reach the winding groove 21 while maintaining the track width TW attained at the magnetic tape sliding face. The reference numerals 17a and 18a designate track grooves.

The provision of the notches 13a and 14a eliminates the butting misalignment of the convex core bodies 17 and 18, and the influences of rounds of edges of the magnetic films 19 and 20.

The track width TW depends on the distance between the notches 13a and 14a. Therefore, the track width TW can be regulated with high accuracy.

Since the track width TW is constant over the range from the face to the winding groove 21, furthermore, the track width TW does not vary even when the head is abraded, so that a head of high reliability is supplied.

As a material of the magnetic films 19 and 20, useful is a Sendust alloy material, a Co amorphous film, a Co superstructure nitriding alloy film, an Fe superstructure nitride film, an Fe nitride film, or the like. These materials may be disposed on the convex core bodies 17 and 18 by a suitable method such as vapor deposition, ion plating, or sputtering.

The magnetic cores 11 and 12 are butted to each other through a gap member which is formed in the form of a film on at least one of the projection end faces of the cores. The gap member (which is not shown) may be made of a material such as $SiO_2$, $ZrO_2$, $Ta_2O_5$, glass, Cr, or a composite of these materials.

When at least a part of the gap member is made of crystallized glass, the gap can be formed in a further satisfactory manner.

The whole of the gap spacer may be made of crystallized glass.

Crystallized glass is glass which, when it is again heated under special conditions after melting and shaping processes, is changed to an amorphous state and crystallized with preserving its original shape to have mechanical and thermal properties which are improved as compared with those of the original glass.

Before the notches 13a and 14a are formed, the two magnetic cores 11 and 12 are firmly welded to each other. Therefore, the track width edges are prevented from being broken during the machining process, whereby the track width and the gap length can be formed stably.

Preferably, the crystallized glass after the crystallization has the yield point higher than that of the glass blocks 15 and 16. When such glass is used, the gap portion is prevented from becoming loose in the process of forming the glass blocks 15 and 16, thereby allowing a gap to be formed in a further satisfactory manner.

A method of producing the magnetic head will be described with reference to FIGS. 3 to 8.

Figure 3:
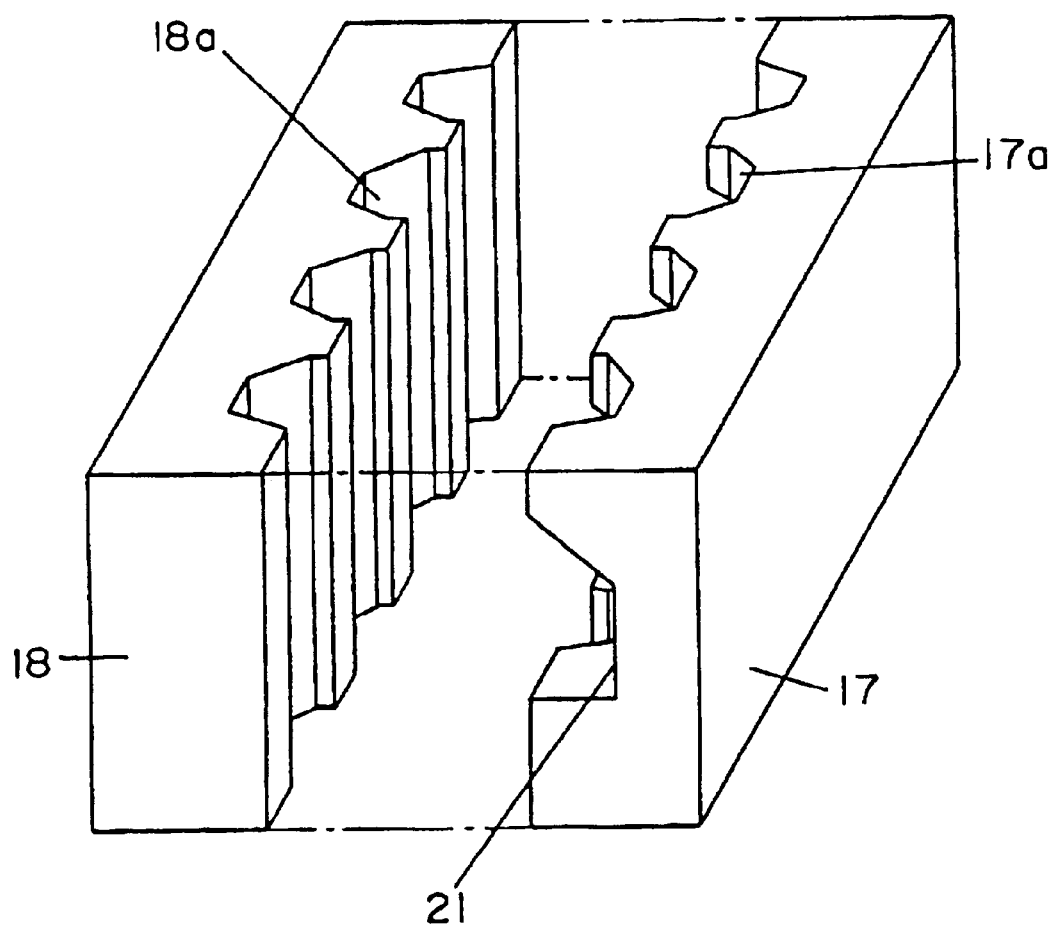
FIG. 3 is a perspective view illustrating a production method of an embodiment of the invention.

First, a pair of substrates made of, for example, Mn—Zn ferrite and having a surface which is formed by a lapping process or the like so as to have excellent parallelism and smoothness are prepared. On the substrates, as shown in FIG. 3, parallel track grooves 17a and 18a for track regulation are formed by a grinding wheel or the like, thereby forming the pair of convex core bodies 17 and 18. At least one of the convex core bodies 17 and 18 is provided with the winding groove 21 through which coils can pass.

Figure 4:
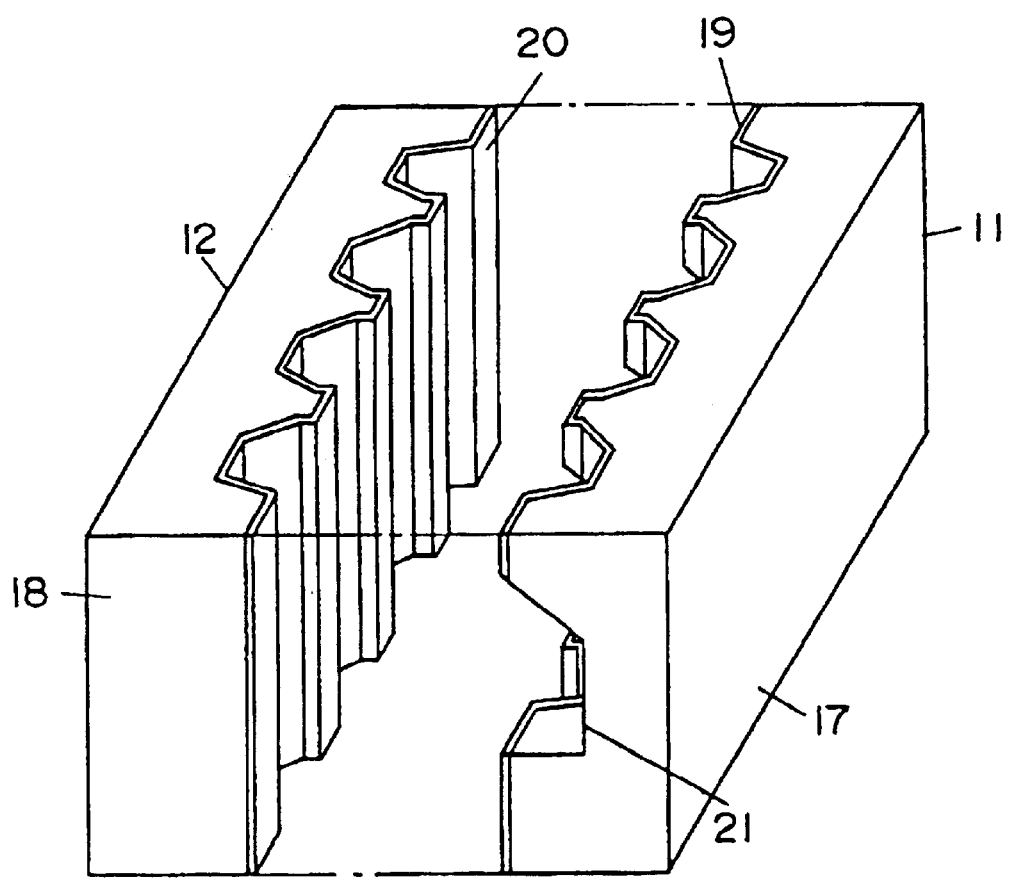
FIG. 4 is a perspective view illustrating the production method of the embodiment of the invention.

As shown in FIG. 4, then, the magnetic films 19 and 20 which have a high saturation magnetic flux density are formed by a vacuum thin film forming technique so as to cover one side face of each of the core bodies 17 and 18, thereby completing the pair of magnetic cores 11 and 12.

Figure 5:
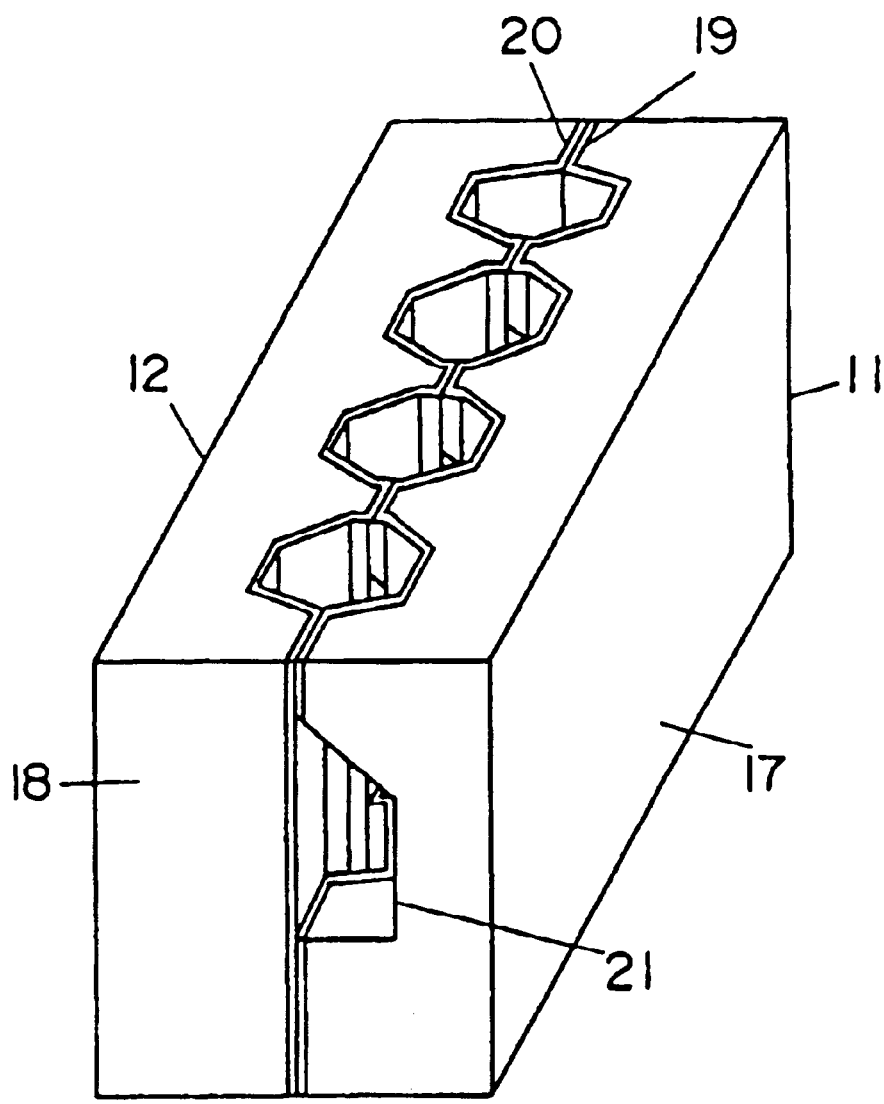
FIG. 5 is a perspective view illustrating the production method of the embodiment of the invention.

Next, a film-like gap member for forming the magnetic gap is disposed on one of the pair of magnetic cores 11 and 12. The magnetic cores 11 and 12 are arranged so as to oppose each other through the gap member as shown in FIG. 5. The gap member (which is not shown) may be made of a material such as $SiO_2$, $ZrO_2$, $Ta_2O_5$, glass, Cr, or a composite of these materials.

Figure 6:
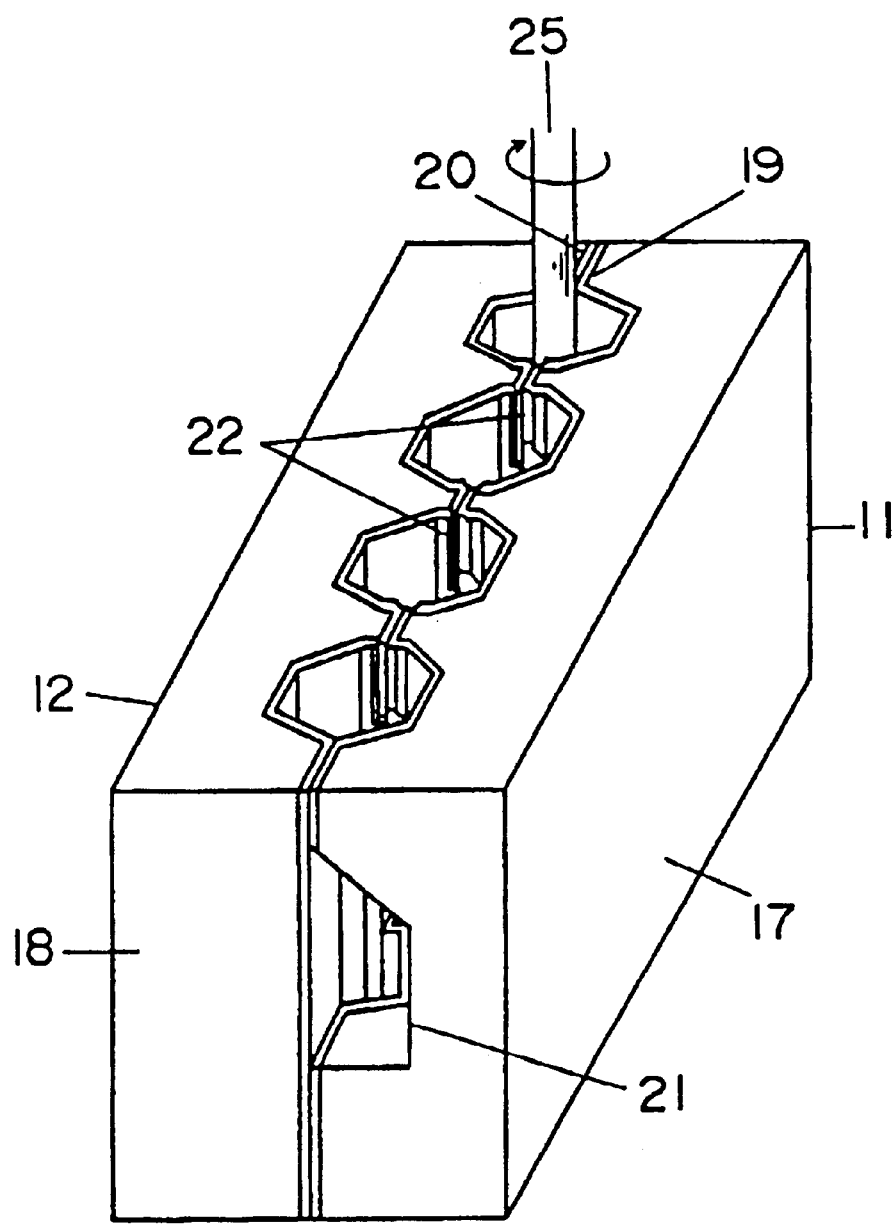
FIG. 6 is a perspective view illustrating the production method of the embodiment of the invention.

As shown in FIG. 6, a discharging electrode 25 is moved so as to approach the side portions of the pair of magnetic cores 11 and 12 in a butted state, to initiate a discharge, thereby forming notches 22. This allows the notches 22 to reach the winding groove 21 while maintaining the track width TW attained at the upper face. The butted state may be realized by supporting the cores by a jig, or by provisionally bonding the cores to each other by means of an adhesive.

In order to further improve the gap accuracy, the following processes may be conducted.

At least a part of the gap member, and the uppermost surface portions of the magnetic cores 11 and 12 are formed by crystallized glass.

Then, the cores in the butted state are heated in an electric oven or the like so that the glass melts.

The crystallized glass becomes amorphous to be crystallized, and has mechanical and thermal properties which are improved as compared with those of the original glass, with the result that the cores can firmly be bonded to each other at the gap portion.

In place of crystallized glass, a metal such as At or Ag may be used so that the cores are heated and pressed to be diffusion-bonded. Alternatively, conventional glass having a low melting point may be used so that heating adhesion is conducted.

In short, any method may be employed as far as it realizes making the gap faces contacted and bonded.

As shown in FIG. 6, then the discharging electrode 25 is moved so as to approach the side portions of the pair of magnetic cores 11 and 12 which are in a bonded state at the gap portion, to initiate a discharge, thereby forming the notches 22.

In the process of forming the notches 22, since the magnetic cores 11 and 12 are already bonded to each other by the crystallized glass, phenomena such as the opening of the gap due to a machining load, the mixture of machining chips into the gap space, and damage to the gap edges can be prevented from occurring, thereby remarkably improving the gap length accuracy and the track width accuracy.

The surface roughness of the notches regulating the track width directly affects the track width accuracy. In order to attain the accuracy of ±0.5 $\mu$m, therefore, at least the surface roughness of 0.5 $\mu$m or less is required, and that of 0.2 $\mu$m or less is more preferable.

In the case where the electric discharge machining was employed, when the single discharge energy was reduced to a level of $10^{-7}$ J, a surface roughness of 0.1 to 0.2 $\mu$m was attained in the process of machining an Fe—Ta—N film.

Generally, the electric discharge machining is conducted in insulating oil. Alternatively, pure water having an electrical resistivity of 1 MΩ·cm or higher may be used. When such water is used, a washing step in postprocesses may be omitted.

Figure 7:
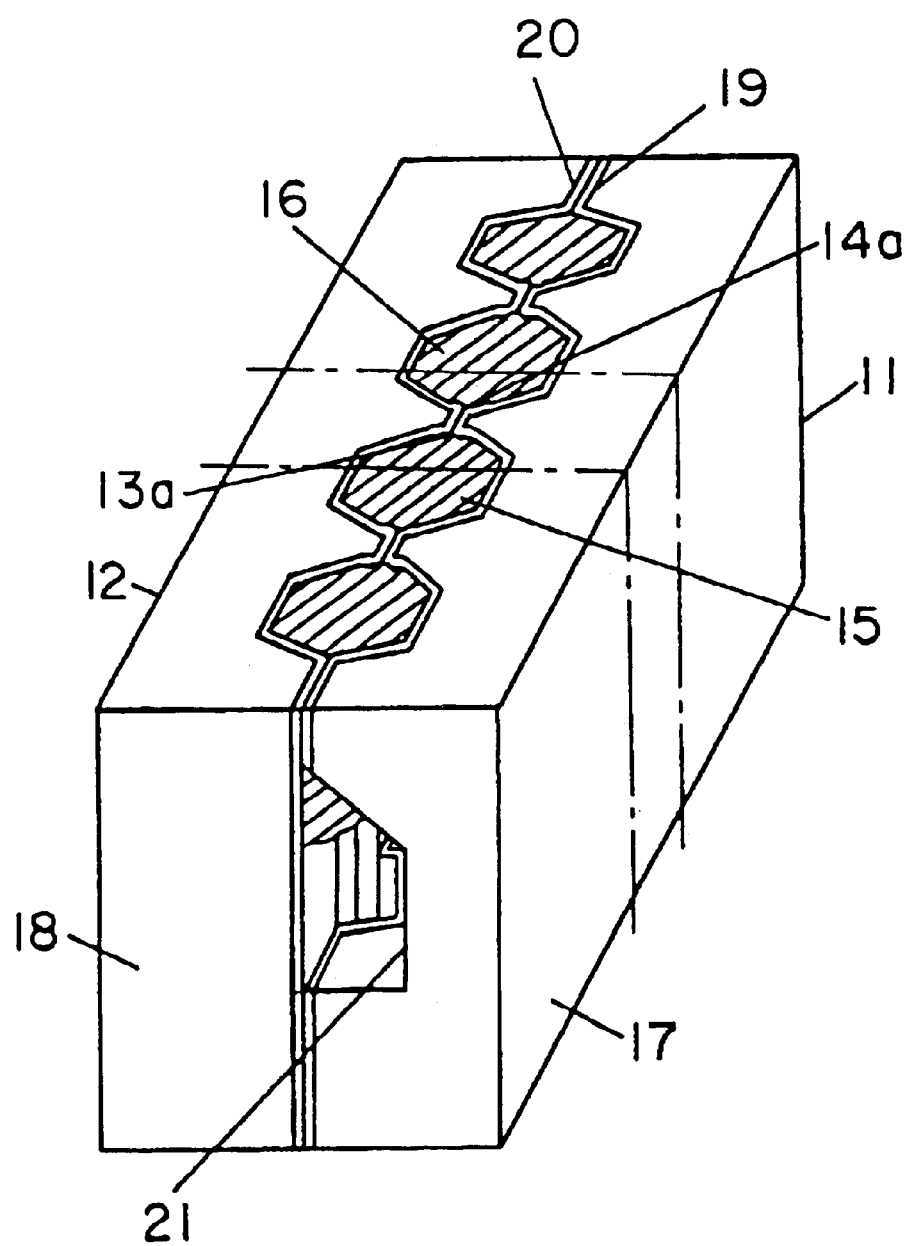
FIG. 7 is a perspective view illustrating the production method of the embodiment of the invention.

As shown in FIG. 7, the pair of magnetic cores 11 and 12 are then coupled to each other by the glass blocks 15 and 16. The glass blocks 15 and 16 are formed by a filling process under heat treatment.

Thereafter, the substrates are sliced into chips as indicated by one-dot chain lines, and coils are wound on each chip.

According to the invention, the magnetic films 19 and 20 are formed also on the side faces of the core bodies 17 and 18 in the vicinity of the magnetic gap 1 which are directed to the magnetic gap, thereby realizing a configuration in which the MIG head can satisfactorily exhibit its advantages that saturation at the gap faces during a recording process is suppressed and that the recording ability is excellent.

When the butting of the convex cores is previously conducted at a certain higher accuracy, the desired objects can be attained by conducting a discharge machining process only on a small portion of the magnetic films. In this case, the machining accuracy and speed are further improved.

Figure 8:
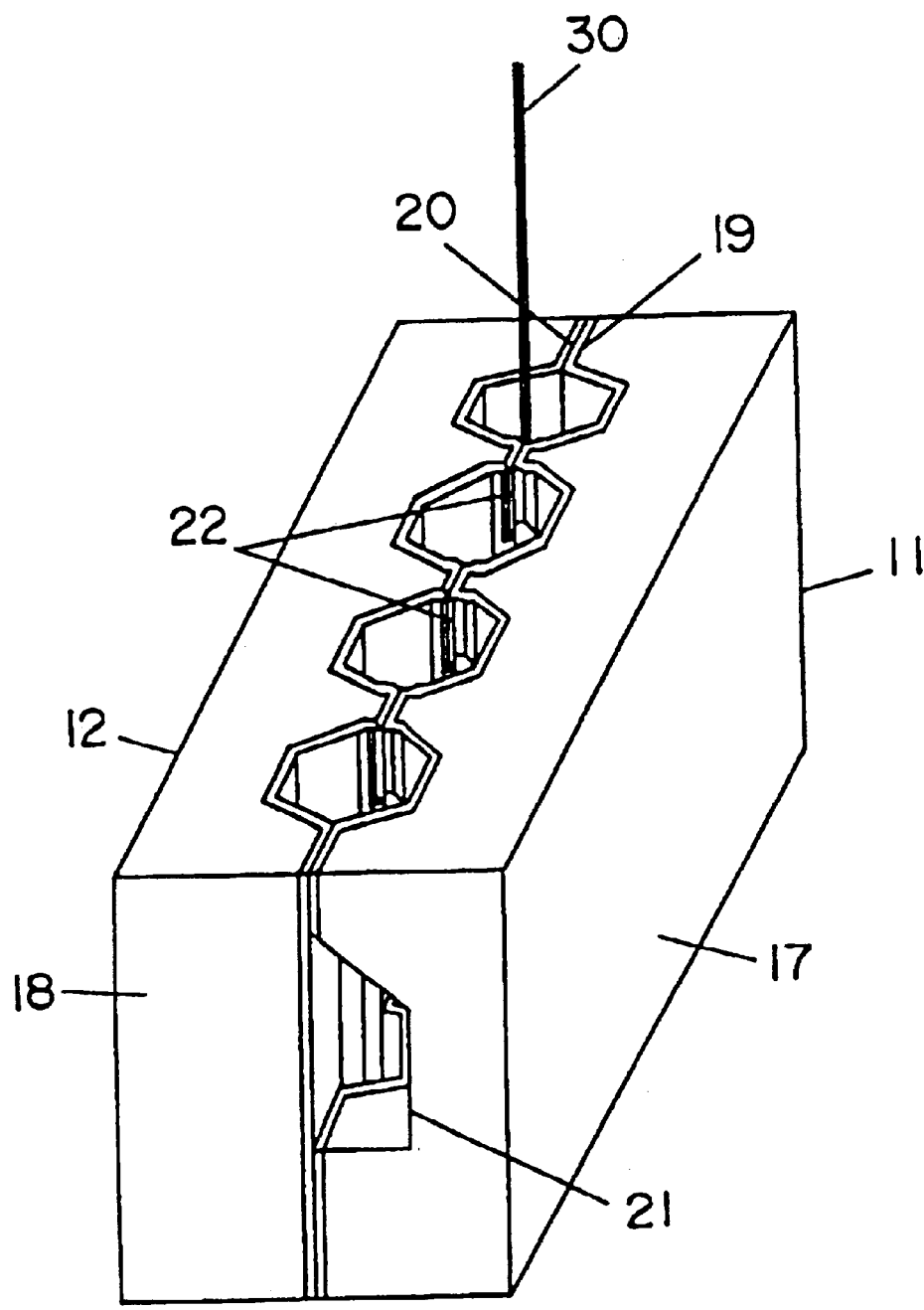
FIG. 8 is a perspective view illustrating a production method of another embodiment of the invention.

In the embodiment described above, the notches 22 are formed by a discharge machining process. Alternatively, the notches 22 may be formed by a laser induced etching process. In this alternative, as shown in FIG. 8, the pair of magnetic cores 11 and 12 in the butted state are irradiated from an upper side with an Ar laser beam 30 (having a spot diameter of 2 &Lm). During this process, the pair of magnetic cores 11 and 12 are immersed in a hydroxide of an alkali metal (for example, KOH), and therefore only a portion irradiated with the laser beam is machined by means of a thermal reaction.

Preferably, the width Cw of the notches 22 in the longitudinal direction of the track is set to be 30 $\mu$m or less. The detail is shown in FIG. 2 (notches are designated by 13a and 14a). According to this configuration, the area to be machined can be reduced so that the machining speed is improved. In the invention, the machining of a notch of a width of 10 $\mu$m required a period of 10 sec. In this case, when the width Cw in the longitudinal direction of the track is 30 $\mu$m, the machining of both the notches 13a and 14a requires 60 sec. in total. This machining speed is equal to that for the track grooves 17a and 18a, and seemed as an upper limit for a mass production.

When the portions of the magnetic films 19 and 20 for forming the notches 22 have a thickness of 3 $\mu$m or more, the machining accuracy is improved (when the film thickness is not greater than the spot diameter of the laser beam, the irradiation region becomes greater than the films so as to make the energy distribution nonuniform, thereby lowering the machining accuracy).

The laser induced etching process is disclosed in Japanese laid open patent publication No. HEI2-276,009. The patent of the publication is directed to a process of machining a core block which is molded by glass, and is not related to a process of machining provisionally joined cores which have not yet been molded by glass as the case of the invention. In the invention, the approximate track regulating process is conducted by a grinding process before the laser induced etching process.

As shown in FIG. 7, then, the pair of magnetic cores 11 and 12 are coupled to each other by the glass blocks 15 and 16. The glass blocks 15 and 16 are formed by a filling process under heat treatment.

Thereafter, the substrates are sliced into chips as indicated by one-dot chain lines, and coils are wound on each chip.

As described above, the invention is particularly effective in a narrow-gap and narrow-track MIG head. The invention can be applied also to a conventional ferrite head, and a head having a relatively large track width, and realizes an enhancement of the yield by means of improving the accuracy.

The configuration in which the magnetic cores 11 and 12 are previously provided with the track grooves 17a and 18a as shown in FIG. 2 can reduce the machining amount of the notches 13a and 14a, and therefore is suitable for a mass production.

Even when the track width Tw is small, furthermore, the configuration in which the track grooves 17a and 18a are respectively machined allows the core width Kw (FIG. 2) to be large, so that a head which is excellent in chip strength and interface is provided.

Figure 9:
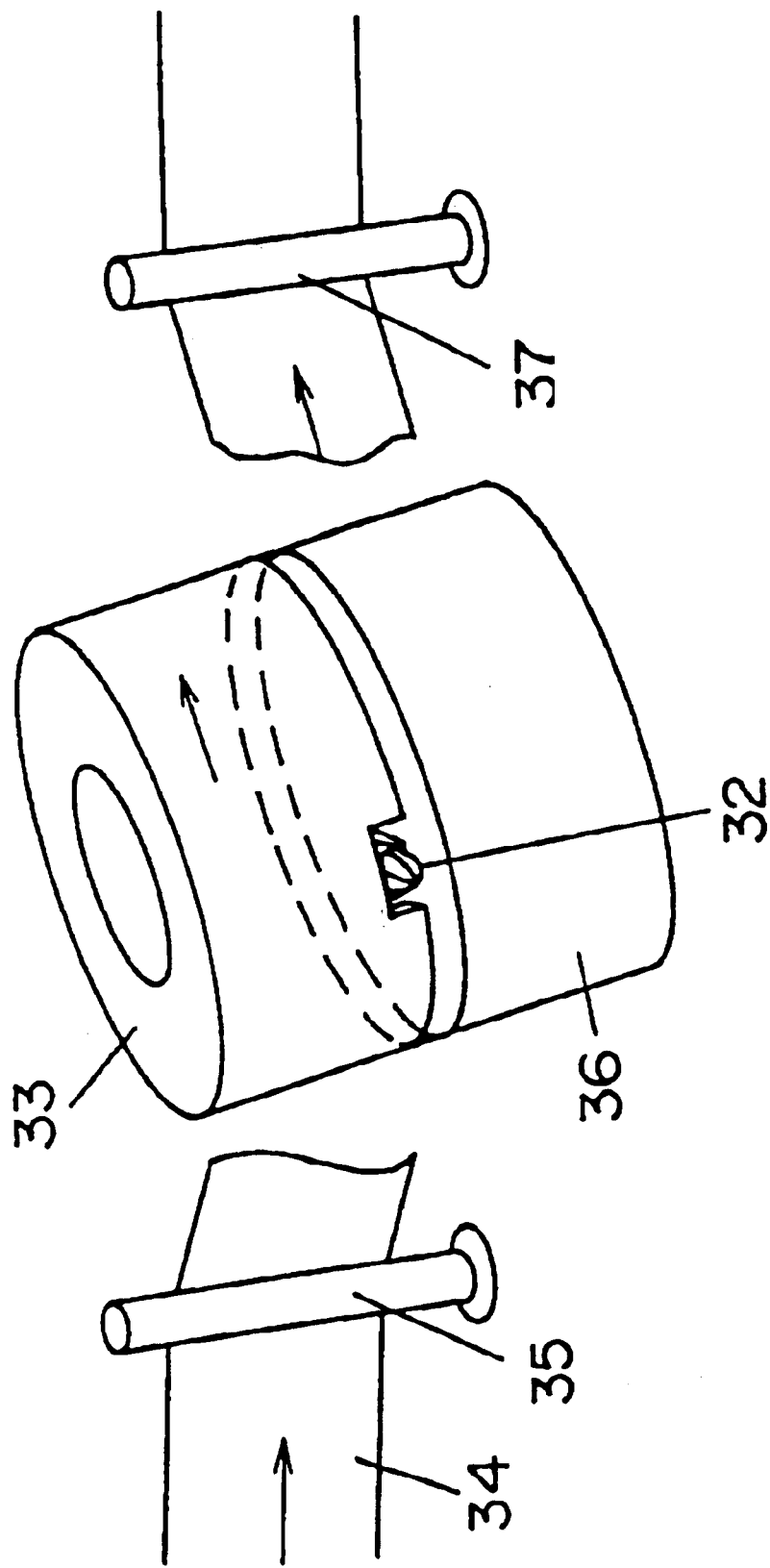
FIG. 9 is a perspective view illustrating a magnetic head in the vicinity of a magnetic recording apparatus of the invention.

FIG. 9 shows an embodiment of the magnetic recording/reproduction apparatus of the invention. While running, a magnetic tape 34 makes contact with a magnetic head 32 mounted on a rotary cylinder 33 which conducts a helical scanning, and a signal is recorded on and reproduced from the magnetic tape 34. According to the invention, a head of a narrow track and free from a track divergence is used, and therefore magnetic fluxes are not blurred at track edges such as side fringes so that a very large amount of information is recorded and reproduced.

Meanwhile the material of the gap member can be non-crystallized glass

What is claimed is:

1. A magnetic head including a pair of magnetic cores that are dis-adjusted with respect to one another by an extent of shift as a result of error in track groove machining inaccuracy and inaccuracy in abutting said cores, said magnetic head comprising:

a magnetic gap member oriented along a direction, a convex shape part forming a part of each of said magnetic cores, said convex shape parts being opposed to each other through said magnetic gap member, each of said convex shape parts defining a concave region; and a pair of glass blocks which are disposed at both sides of said magnetic cores to couple said magnetic cores to each other;

said magnetic cores having a pair of notches, each of said notches being located at a bottom portion of one of said concave regions, said notches defining a single track width for said magnetic head to be between said notches, said notches being outside of said track width, each of said notches running from a side of said convex shape part included in one of said magnetic cores to a side of said convex part included in the other of said magnetic cores, each of said notches having a portion proximate said gap member which forms a plane surface that is perpendicular to said direction of said gap member, said sides of said convex shape parts being at right angles with a magnetic tape sliding face, and said notches having a depth, in said direction of said magnetic gap member, that exceeds said shift of said magnetic cores.

2. A magnetic head according to claim 1, wherein a width of said notches in a longitudinal direction of a track of said track width is 30 μm or less and wherein neither of said notches has a portion substantially parallel with said direction of said gap member.

3. A magnetic head according to claim 1 or claim 2, wherein said magnetic cores are made of a composite of ferrite and a metal magnetic film, and the notches are formed only in said metal magnetic film.

4. A magnetic head according to one of claims 1 or 2, wherein at least a part of said magnetic gap member is formed by crystallized glass.

5. A magnetic head according to claim 1, wherein said notches respectively reach a winding groove while maintaining said track width.

6. A magnetic head according to claim 5, wherein a width of said notches in a longitudinal direction of a track is 30 μm or less.

7. A magnetic head according to claim 6, wherein said magnetic cores are made of a composite of ferrite and a metal film, and said notches are formed only in the film.

8. A magnetic head according to claim 7, wherein at least a part of said magnetic gap member is formed by crystallized glass.

9. A magnetic head according to claim 6, wherein at least a part of said magnetic gap member is formed by crystallized glass.

10. A magnetic head according to claim 5, wherein said magnetic cores are made of a composite of ferrite and a metal magnetic film, and said notches are formed only in the metal magnetic film.

11. A magnetic head according to claim 10, wherein at least a part of said magnetic gap member is formed by crystallized glass.

12. A magnetic head according to claim 5, wherein at least a part of said magnetic gap member is formed by crystallized glass.

13. A magnetic recording/reproduction apparatus comprising:

a magnetic head for recording a recording signal in a medium of magnetic recording, and for detecting the recording signal in the medium of magnetic recording; and a mounting means for mounting said magnetic head so that said magnetic head comes into contact with the medium, said magnetic head including a magnetic gap member oriented along a direction, a pair of magnetic cores each of which has a convex shape part, said convex shape parts being opposed to each other through said magnetic gap member, each of said convex shape parts defining a concave region, and said magnetic cores being dis-adjusted with respect to one another by an extent of shift as a result of error in track groove machining inaccuracy and inaccuracy in abutting said cores, and a pair of glass blocks which are disposed at both sides of said magnetic cores to couple said magnetic cores to each other, said magnetic cores having a pair of notches, each of said notches being located at a bottom portion of one of said concave regions, said notches defining a single track width for said magnetic head to be between said notches, said notches being outside of said track width, each of said notches running from a side of said convex shape part included in one of said magnetic cores to a side of said convex part included in the other of said magnetic cores, each of said notches having a portion proximate said gap member which forms a plane surface that is perpendicular to said direction of said gap member, and said sides of said convex shape parts being at right angles with a magnetic tape sliding face, and said notches having a depth, in said direction of said magnetic gap member, that exceeds said shift of said magnetic cores.

14. A magnetic recording/reproduction apparatus comprising:

a magnetic head for recording a recording signal in a medium of magnetic recording, and for detecting the recording signal in the medium of magnetic recording; and a mounting means for mounting said magnetic head so that said magnetic head comes into contact with the medium, said magnetic head having a structure obtained by a first step of butting projection end faces of a pair of magnetic cores each of which is previously machined to have a convex shape part, through a magnetic gap member oriented along a direction, each of said convex shape parts defining a concave region, and said magnetic cores being dis-adjusted with respect to one another by an extent of shift as a result of error in track groove machining inaccuracy and inaccuracy in abutting said cores, a second step of forming notches which reach a winding groove, at said butted projection end faces of said magnetic cores by an electric discharge machining process, thereby regulating said magnetic head to have a single track width between said notches, said notches being outside of said track width, each of said notches being located at a bottom portion of one of said concave regions, and having a portion proximate said gap member which forms a plane surface that is perpendicular to said direction of said gap member, and said notches having a depth, in said direction of said magnetic gap member, that exceeds said shift of said magnetic cores, and a third step of filling under heat treatment glass into grooves at two sides of said pair of convex magnetic cores and said notches.

15. A magnetic recording/reproduction apparatus comprising:

a magnetic head for recording a recording signal in a medium of magnetic recording, and for detecting the recording signal in the medium of magnetic recording; and a mounting means for mounting said magnetic head so that said magnetic head comes into contact with the medium, said magnetic head including a magnetic gap member oriented along a direction, a pair of magnetic cores each of which has a convex shape part, said convex shape parts being opposed to each other through said magnetic gap member, each of said convex shape parts defining a concave region, and said magnetic cores being dis-adjusted with respect to one another by an extent of shift as a result of error in track groove machining inaccuracy and inaccuracy in abutting said cores, and a pair of glass blocks which are disposed at both sides of said magnetic cores to couple said magnetic cores to each other, said magnetic cores having a pair of notches, each of said notches being located at a bottom portion of one of said concave regions, said notches defining a single track width for said magnetic head to be between said notches, said notches being outside of said track width, each of said notches running from a side of said convex shape part included in one of said magnetic cores to a side of said convex part included in the other of said magnetic cores, each of said notches having a portion proximate said gap member which forms a plane surface that is perpendicular to said direction of said gap member, and said sides of said convex shape parts being at right angles with a magnetic tape sliding face, a width of said notches in a longitudinal direction of a track of said width being 30 $\mu$m or less, and said notches having a depth, in said direction of said magnetic gap member, that exceeds said shift of said magnetic cores.

16. A magnetic recording/reproduction apparatus comprising:

a magnetic head for recording a recording signal in a medium of magnetic recording, and for detecting the recording signal from the medium of magnetic recording; and a mounting means for mounting said magnetic head so that said magnetic head comes into contact with the medium, said magnetic head having a structure obtained by a first step of butting projection end faces of a pair of magnetic cores each of which is previously machined to have a convex shape part, through a magnetic gap member oriented along a direction, each of said convex shape parts defining a concave region, and said magnetic cores being dis-adjusted with respect to one another by an extent of shift as a result of error in track groove machining inaccuracy and inaccuracy in abutting said cores, a second step of bonding said projection end faces to each other under the butted state by using at least a part of said magnetic gap member, a third step of forming notches which reach a winding groove, at said butted projection end faces of said magnetic cores by an electric discharge machining process, thereby regulating said magnetic head to have a single track width between said notches, said notches being outside of said track width, each of said notches being located at a bottom portion of one of said concave regions, and having a portion proximate said gap member which forms a plane surface that is perpendicular to said direction of said gap member, and said notches having a depth, in said direction of said magnetic gap member, that exceeds said shift of said magnetic cores, and a fourth step of filling under heat treatment glass into grooves at two sides of said pair of convex magnetic cores and said notches.

17. A magnetic recording/reproduction apparatus comprising:

a magnetic head for recording a recording signal in a medium of magnetic recording, and for detecting the recording signal from the medium of magnetic recording; and a mounting means for mounting said magnetic head so that said magnetic head comes into contact with the medium, said magnetic head having a structure obtained by a first step of butting projection end faces of a pair of magnetic cores each of which is previously machined to have a convex shape part, through a magnetic gap member oriented along a direction, each of said convex shape parts defining a concave region, and said magnetic cores being dis-adjusted with respect to one another by an extent of shift as a result of error in track groove machining inaccuracy and inaccuracy in abutting said cores, a second step of forming notches which reach a winding groove, at said butted projection end faces of said magnetic cores by a laser induced etching process, thereby regulating said magnetic head to have a single track width between said notches, said notches being outside of said track width, each of said notches being located at a bottom portion of one of said concave regions, and having a portion proximate said gap member which forms a plane surface that is perpendicular to said direction of said gap member, and said notches having a depth, in said direction of said magnetic gap member, that exceeds said shift of said magnetic cores, and a third step of filling under heat treatment glass into grooves at two sides of said pair of convex magnetic cores and said notches.

18. A magnetic recording/reproduction apparatus comprising:

a magnetic head for recording a recording signal in a medium of magnetic recording, and for detecting the recording signal from the medium of magnetic recording; and a mounting means for mounting said magnetic head so that said magnetic head comes into contact with the medium, said magnetic head having a structure obtained by a first step of butting projection end faces of a pair of magnetic cores each of which is previously machined to have a convex shape part, through a magnetic gap member oriented along a direction, each of said convex shape parts defining a concave region, and said magnetic cores being dis-adjusted with respect to one another by an extent of shift as a result of error in track groove machining inaccuracy and inaccuracy in abutting said cores, a second step of bonding said projection end faces to each other under the butted state by using at least a part of said magnetic gap member, a third step of forming notches which reach a winding groove, at said butted projection end faces of said magnetic cores by a laser induced etching process, thereby regulating said magnetic head to have a single track width between said notches, said notches being outside of said track width, each of said notches being located at a bottom portion of one of said concave regions, and having a portion proximate said gap member which forms a plane surface that is perpendicular to said direction of said gap member, and said notches having a depth, in said direction of said magnetic gap member, that exceeds said shift of said magnetic cores, and a fourth step of filling under heat treatment glass into grooves at two sides of said pair of convex magnetic cores and said notches.

* * * * *